United States Patent
Motoyama

(10) Patent No.: US 7,377,600 B2
(45) Date of Patent: May 27, 2008

(54) TURNING BEHAVIOR CONTROL DEVICE FOR VEHICLE

(75) Inventor: Sumio Motoyama, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 242 days.

(21) Appl. No.: 11/256,100

(22) Filed: Oct. 24, 2005

(65) Prior Publication Data
US 2006/0091727 A1 May 4, 2006

(30) Foreign Application Priority Data
Oct. 25, 2004 (JP) .................. P2004-309075

(51) Int. Cl.
*B60T 8/56* (2006.01)
(52) U.S. Cl. ...................... 303/142; 303/146
(58) Field of Classification Search ............... 303/148, 303/149, 146, 142; 701/70, 72, 73; 192/222, 192/218, 221; 477/183, 203
See application file for complete search history.

(56) References Cited

U.S. PATENT DOCUMENTS

| 5,742,917 | A | * | 4/1998 | Matsuno | 701/69 |
| 6,094,614 | A | * | 7/2000 | Hiwatashi | 701/89 |
| 6,360,150 | B1 | * | 3/2002 | Fukushima et al. | 701/41 |
| 6,442,469 | B1 | * | 8/2002 | Matsuno | 701/70 |
| 6,792,344 | B2 | * | 9/2004 | Minowa et al. | 701/96 |
| 2002/0045981 | A1 | * | 4/2002 | Ichikawa et al. | 701/91 |
| 2002/0153770 | A1 | | 10/2002 | Matsuno et al. | |
| 2004/0162663 | A1 | | 8/2004 | Kogure et al. | |
| 2004/0267429 | A1 | * | 12/2004 | Matsuno et al. | 701/80 |

FOREIGN PATENT DOCUMENTS

| DE | 19549715 B4 | 9/2004 |
| EP | 1396372 A2 | 3/2004 |
| JP | 3183124 B2 | 4/2001 |

* cited by examiner

*Primary Examiner*—Robert A. Siconolfi
*Assistant Examiner*—Vu Q Nguyen
(74) *Attorney, Agent, or Firm*—Birch, Stewart, Kolasch & Birch, LLP

(57) ABSTRACT

A turning behavior control device for vehicle has a left and right wheel driving force adjustment mechanism for adjusting a difference in driving force between rear wheels, a braking force adjustment mechanism for adjusting a difference in braking force between the wheels, a vehicle velocity sensor, a steering wheel sensor and a yaw rate sensor for detecting the behavior of the vehicle, and a control unit for controlling the left and right wheel driving force adjustment mechanism and the braking force adjustment mechanism, based on the vehicle velocity, the steering angle and the yaw rate detected by the sensors, and changing at least one of the left and right driving force control amount of the left and right wheel driving force adjustment mechanism and the braking force control amount of the braking force adjustment mechanism.

8 Claims, 7 Drawing Sheets

TURNING BEHAVIOR CONTROL DEVICE FOR VEHICLE

CROSS REFERENCE TO RELATED APPLICATION

This non-provisional application incorporates by reference the subject matter of Application No. 2004-309075 filed in Japan on Oct. 25, 2004, on which a priority claim is based under 35 U.S.C. §119(a).

BACKGROUND OF THE INVENTION

1. Field of the Invention

The present invention relates to a turning behavior control device for vehicle.

2. Description of the Related Art

In general, the vehicle is provided with a left and right wheel driving force adjustment mechanism and a braking force adjustment mechanism to control the behavior of vehicle and stabilize the vehicle while turning. The left and right wheel driving force adjustment mechanism is one that adjusts a difference in driving power between the left and right wheels according to a behavior of the vehicle, and improves the turning performance of the vehicle by controlling the driving force transfer to the left and right wheels while turning. Also, the braking force adjustment mechanism is one that puts a difference in the braking effort between the wheels according to a turning state of the vehicle, to improve stability and turning performance of the vehicle by individually controlling the braking pressure distribution among the wheels while turning.

One example of the conventional turning behavior control device comprises the left and right wheel driving force adjustment mechanism and the braking force adjustment mechanism as mentioned above and controls both the mechanisms according of a yaw rate deviation that is the difference between the target yaw rate calculated based on the vehicle velocity and a steering wheel angle and the actual yaw rate actually occurring in the vehicle. In this example, when the yaw rate deviation is greater than or equal to the first threshold value and less than the second threshold value, the left and right wheel driving force adjustment mechanism is only operated, and when it is greater than or equal to the second threshold value, both mechanisms are operated.

The conventional turning behavior control device of the vehicle was disclosed in Japanese Patent No. 3183124, for instance.

SUMMARY OF THE INVENTION

However, the conventional turning behavior control for vehicle did not deal with the road surface situation. On the road surface with low frictional coefficient, if the left and right wheel driving force adjustment mechanism is utilized to the maximum, one wheel slips in the driving direction, and the other wheel slips in the braking direction, possibly causing a lateral force (grip force) of the tire to fall significantly. Especially in the vehicle with the left and right wheel driving force adjustment mechanism on the rear wheels, even if a moment against over-steering is given to the vehicle by the left and right wheel driving force adjustment mechanism, in the over-steering suppression control, a moment for over-steering is given to the vehicle due to a lower lateral force of the rear wheels, whereby it is difficult to make the handling and stability of the vehicle.

Accordingly, this invention has been achieved to solve the above-mentioned problems, and it is an object of the invention to provide a turning behavior control device for vehicle wherein the handling and stability of the vehicle is improved by varying the control amount of each adjustment mechanism for giving a moment to the vehicle depending on the road surface situation.

In order to accomplish the above object, the present invention provides a turning behavior control device for a vehicle comprising a left and right wheel driving force adjustment unit that adjusts a difference in driving force between left and right wheels for the vehicle, a braking force adjustment unit that adjusts a difference in braking force between each wheel for the vehicle, a vehicle behavior detection unit that detects the behavior of the vehicle, a road surface situation information acquisition unit that acquires the information concerning a road surface situation, a control unit that controls the left and right wheel driving force adjustment unit and the braking force adjustment unit by setting a left and right driving force control amount and a braking force control amount, based on the vehicle behavior detected by the vehicle behavior detection unit, and a control amount change unit that changes at least one of the left and right driving force control amount and the braking force control amount based on the information acquired by the road surface situation information acquisition unit.

With the turning behavior control device for vehicle according to the invention, the handling and stability of the vehicle is improved by varying the control amount of the adjustment mechanism for giving moment to the vehicle according to a road surface situation.

DETAILED DESCRIPTION OF PREFERRED EMBODIMENTS

Embodiments of the present invention will be described below in detail with reference to the drawings.

Embodiment 1

Figure 1:
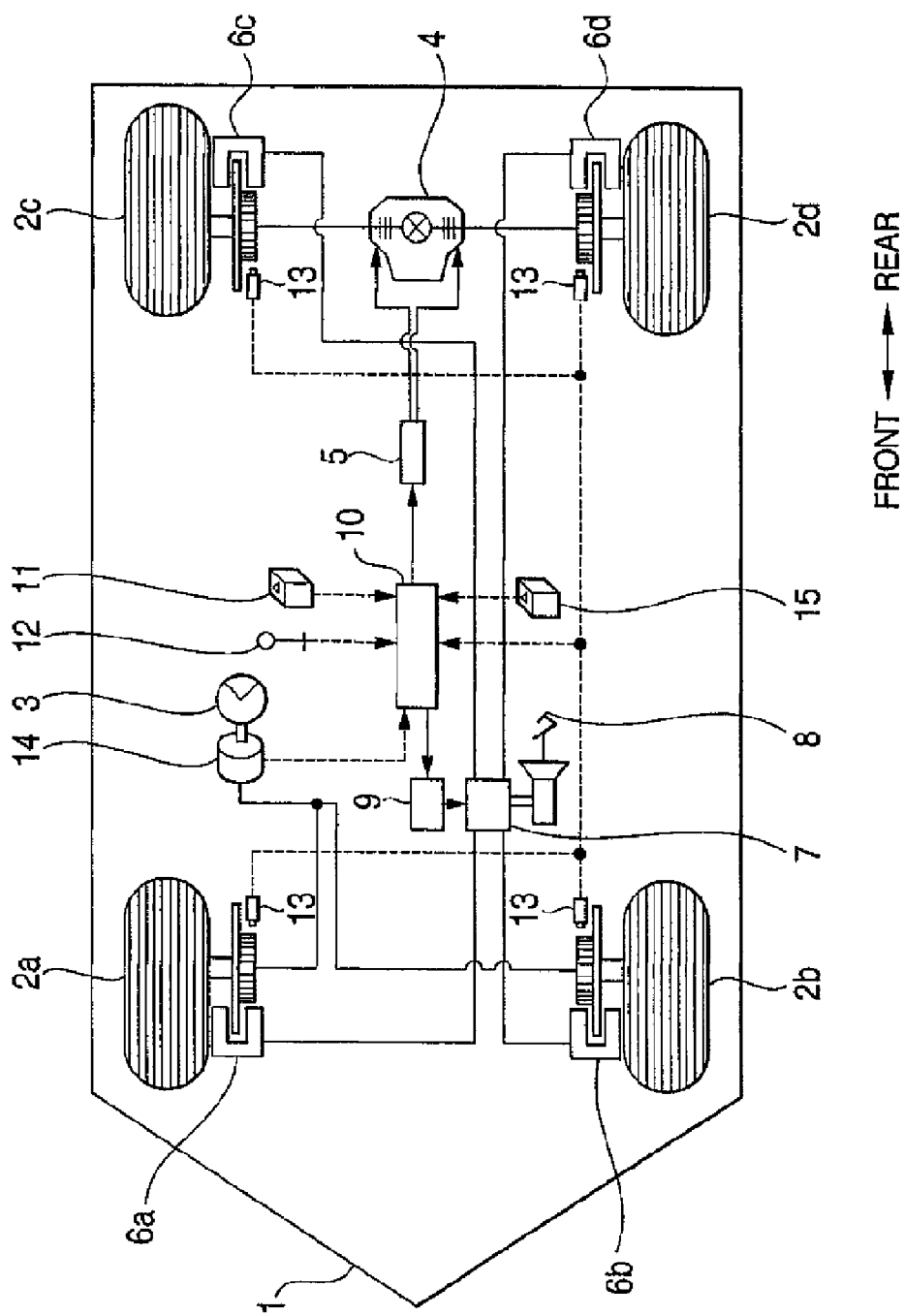
FIG. 1 is a schematic diagram of the vehicle having a turning behavior control device according to a first embodiment of the present invention.
Figure 2:
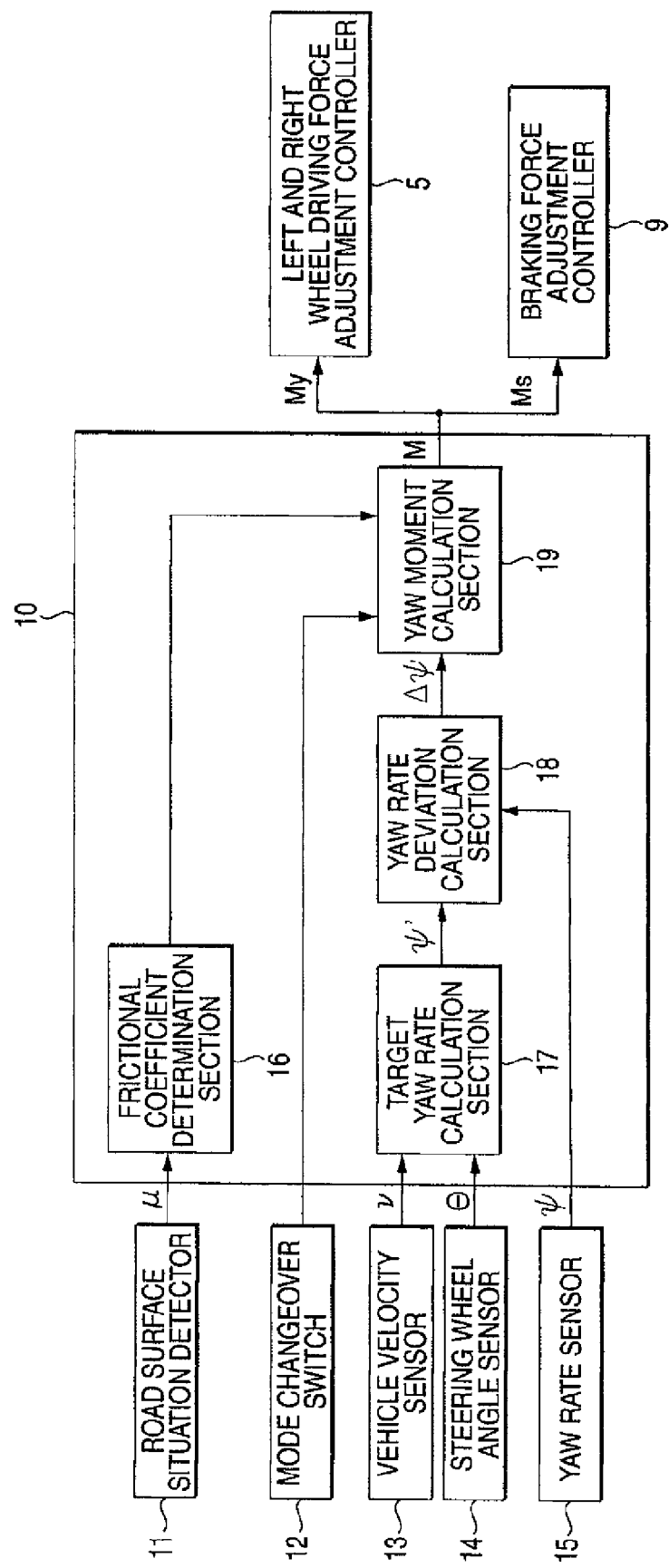
FIG. 2 is a block diagram of a control unit in the turning behavior control device.
Figure 3C:
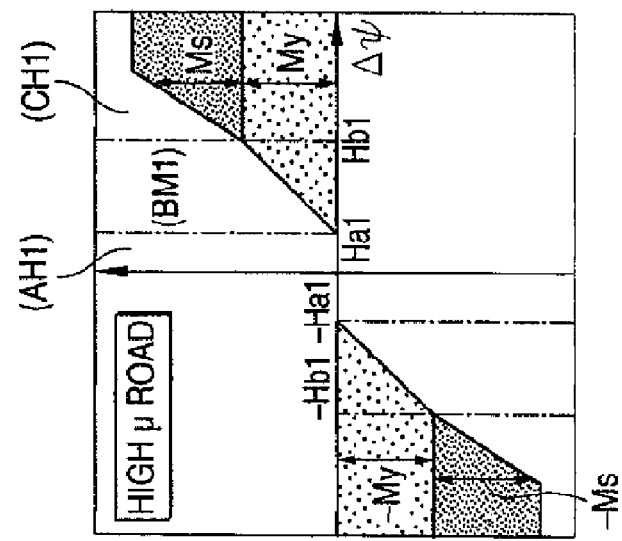
FIG. 3C is a graph showing conceptually the control system on a high $\mu$ road.
Figure 3B:
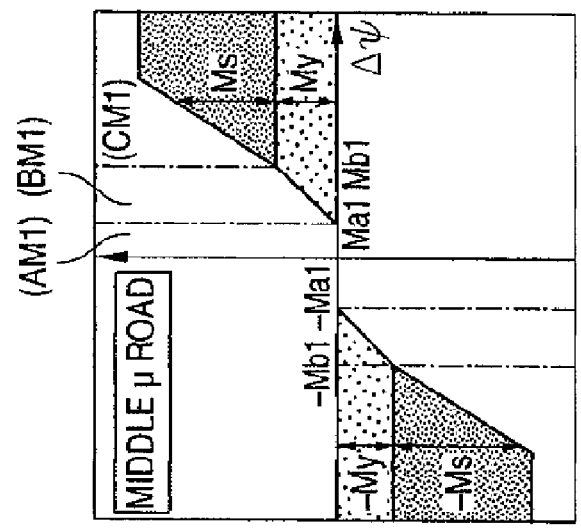
FIG. 3B is a graph showing conceptually the control system on a middle $\mu$ road.
Figure 3A:
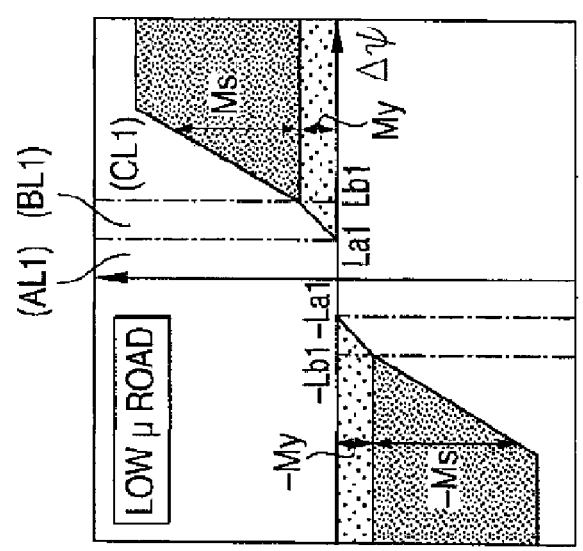
FIG. 3A is a graph showing conceptually a control system on a low $\mu$ road.

FIG. 1 is a schematic diagram of the vehicle having a turning behavior control device according to a first embodiment of the invention. FIG. 2 is a block diagram of a control unit. FIGS. 3A to 3C are graphs showing conceptually an integral control system for the left and right wheel driving force adjustment control and the braking force adjustment control according to frictional coefficient.

The turning behavior control device for vehicle according to this embodiment is mounted on the vehicle 1, which has the front wheels 2a, 2b and the rear wheels 2c, 2d, as shown in FIG.

The front wheels 2a and 2b are connected to a steering 3 via a steering mechanism (not shown), and can be steered by operating the steering 3.

On the other hand, a left and right wheel driving force adjustment mechanism 4 is provided between the rear wheels 2c and 2d, and connected to a left and right wheel driving force adjustment controller 5. The left and right wheel driving force adjustment mechanism 4 transfers a driving force from an engine (not shown) to the rear wheels 2c and 2d. The left and right wheel driving force adjustment mechanism 4 controls a transfer amount of the driving force to the rear wheels 2c and 2d, based on a signal from the left and right wheel driving force adjustment controller 5.

And the wheels 2a to 2d are provided with the brake mechanisms 6a, 6b, 6c and 6d, respectively. The brake mechanisms 6a to 6d are connected to a braking force adjustment mechanism 7, and controlled individually by the braking force adjustment mechanism 7 to give a braking force (braking effort) to each of the wheels 2a to 2d. The braking force adjustment mechanism 7 is connected to a brake pedal 8 and a braking force adjustment controller 9 to give a braking force to each of the brake mechanisms 6a to 6d according to a pedaling force of the brake pedal 8, and give a braking force difference to each of the brake mechanisms 6a to 6d based on a signal from the braking force adjustment controller 9.

The left and right wheel driving force adjustment controller 5 and the braking force adjustment controller 9 are connected to the control unit 10. The control unit 10 employs an electronic control unit called an ECU, which is itself composed of a control program, a storage unit (ROM, RAM, etc.) for control map or calculation, a central processing unit (CPU) for performing the arithmetical operation, a timer counter, and an interface for input or output of the control signal.

The control unit 10 is connected to a road surface situation detector 11, a mode changeover switch 12, a vehicle velocity sensor 13, a steering wheel angle sensor 14 and a yaw rate sensor 15.

The road surface situation detector 11 detects or estimates the frictional coefficient of the road surface where the vehicle 1 is running. The mode changeover switch 12 is near the driver's seat, and manipulated by the driver. By manipulating this mode changeover switch 12, a control map of the control unit 10 can be changed. The vehicle velocity sensor 13 is provided on each of the wheels 2a to 2d to detect the vehicle velocity of the vehicle 1, in which the velocity of the vehicle 1 is acquired from the average velocity of each wheel speed, or the velocity of the vehicle 1 is acquired from the average velocity of the coupled driving wheel. The steering wheel angle sensor 14 is attached on the steering mechanism to detect the steering angle of the steering 3. The yaw rate sensor 15 detects the yaw rate (angular velocity of rotation) around the vertical axis of the vehicle 1.

Referring to FIG. 2, the configuration of the control unit 10 will be described below.

The control unit 10 comprises a frictional coefficient determination section 16, a target yaw rate calculation section 17, a yaw rate deviation calculation section 18 and a yaw moment calculation section 19, as shown in FIG. 2.

The frictional coefficient determination section 16 switches the control maps, based on a frictional coefficient $\mu$ of the road surface where the vehicle 1 is running detected by the road surface situation detector 11. The target yaw rate calculation section 17 calculates the target yaw rate $\psi'$ when the vehicle 1 is turning, based on the vehicle velocity V of the vehicle 1 detected by the vehicle velocity sensor 13 and the steering angle $\theta$ of the steering 3 detected by the steering wheel angle sensor 14. The yaw rate deviation calculation section 18 calculates the yaw rate deviation $\Delta\psi$, based on the target yaw rate $\psi'$ calculated by the target yaw rate calculation section 17 and the yaw rate (actual yaw rate) $\psi$ actually occurring on the vehicle 1 detected by the yaw rate sensor 15.

The yaw moment calculation section 19 calculates a required yaw moment M given to the vehicle 1 while turning, based on the yaw rate deviation $\Delta\psi$ calculated by the yaw rate deviation calculation section 18, and distributes the required yaw moment M to the left and right wheel driving force adjustment controller 5 and the braking force adjustment controller 9 at a predetermined ratio. At this time, it is assumed that the yaw moment distributed to the left and right wheel driving force adjustment controller 5 (left and right wheel driving force adjustment mechanism 4) is My and the yaw moment distributed to the braking force adjustment controller 9 (braking force adjustment mechanism 7) is Ms. That is, the yaw moment calculation section 19 distributes the required yaw moment M to the left and right wheel driving force adjustment controller 5 and the braking force adjustment controller 9 to satisfy the expression M=My+Ms.

That is, the control unit 10 controls the left and right wheel driving force adjustment mechanism 4 and the braking force adjustment mechanism 7 integrally via the left and right wheel driving force adjustment controller 5 and the braking force adjustment controller 9 by distributing the required yaw moment (operation amount) to them, based on the frictional coefficient $\mu$ detected by the road surface situation detector 11, the vehicle velocity V detected by the vehicle velocity sensor 13, the steering angle $\theta$ of the steering 3 detected by the steering wheel angle sensor 14 and the yaw rate $\psi$ of the vehicle 1 detected by the yaw rate sensor 15.

A processing procedure of the control unit 10 configured in the above way will be described below.

The frictional coefficient $\mu$, the vehicle velocity V, the steering angle $\theta$ and the yaw rate $\psi$ are detected at every predetermined period. If a signal of the detected frictional coefficient $\mu$ is inputted into the frictional coefficient determination section 16, the magnitude of frictional coefficient $\mu$ is determined. This determination is made based on whether or not the frictional coefficient $\mu$ is greater than a first threshold value $\mu a1$, and if it is greater than the first threshold value $\mu a1$, whether or not it is less than a second threshold value $\mu b1$. And there are following three cases (1) to (3), depending on the magnitude of the frictional coefficient $\mu$.

$$|\mu| < \mu a1 \quad (1)$$

$$\mu a1 \leq |\mu| < \mu b1 \quad (2)$$

$$\mu b1 \leq |\mu| \quad (3)$$

As described above, three ranges are set up by setting the first threshold value $\mu a1$ and the second threshold value $\mu b1$, in which the range (1) is a low g road, the range (2) is a middle μ road, and the range (3) is a high μ road. And any signal is outputted to the yaw moment calculation section 19.

If a signal of the detected vehicle velocity V and steering angle θ is inputted into the target yaw rate calculation section 17, the target yaw rate ψ' is calculated. On the other hand, if a signal of the detected yaw rate ψ is inputted into the yaw rate deviation calculation section 18, the yaw rate deviation Δψ is calculated based on the yaw rate ψ and the target yaw rate ψ' inputted from the target yaw rate calculation section 17, and its signal is outputted to the yaw moment calculation section 19. At this time, the yaw rate deviation Δψ is obtained from a difference (Δψ=ψ'−ψ) between the target yaw rate ψ' and the yaw rate ψ.

The yaw moment calculation section 19 first of all switches to a control map of low μ road, middle μ road or high μ road, based on a signal inputted from the frictional coefficient determination section 16. Then, the yaw rate calculation section 19 calculates the required yaw moment M, based on the yaw rate deviation Δψ inputted from the yaw rate deviation calculation section 18, and determines the magnitude of yaw rate deviation Δψ. This determination is made based on whether or not the yaw rate deviation Δψ is greater than a first threshold value La1, Ma1 or Ha1, depending on the range (1) to (3) for the frictional coefficient μ, and further whether or not it is less than a second threshold value Lb1, Mb1 or Hb1, if it is greater than the first threshold value La1, Ma1 or Ha1. And there are following three cases (AL1) to (CL1) for the range (1), (AM1) to (CM1) for the range (2), and (AH1) to (CH1) for the range (3), depending on the magnitude of yaw rate deviation Δψ.

Case of range (1)

|Δψ|<La1      (AL1)

La1≦|Δψ|<Lb1      (BL1)

Lb1≦|Δψ|      (CL1)

Case of range (2)

|Δψ|<Ma1      (AM1)

Ma1≦|Δψ|<Mb1      (BM1)

Mb1≦|Δψ|      (CM1)

Case of range (3)

|Δψ|<Ha1      (AH1)

Ha123 |Δψ|<Hb1      (BH1)

Hb1≦|Δψ|      (CH1)

As a result of this determination process, if it is determined that the yaw rate deviation Δψ is in the range (AL1), (AM1) or (AH1), the required yaw moment M given to the vehicle 1 is not calculated, based on the yaw rate deviation Δψ. Thereby, since the yaw rate deviation Δψ at this time is substantially negligible, the left and right wheel driving force adjustment mechanism 4 and the braking force adjustment mechanism 7 are not operated unnecessarily. That is, the yaw rate calculation section 19 outputs a signal with My=0 and Ms=0 to the left and right wheel driving force adjustment controller S and the braking force adjustment controller 9.

Accordingly, in the range (AL1), (AM1) or (AH1), the control is made based on the yaw rate deviation Δψ to satisfy M=My=Ms=0.

Next, if it is determined that the yaw rate deviation Δψ is in the range (BL1), (BM1) or (BH1), the required yaw moment M given to the vehicle 1 is calculated, based on the yaw rate deviation Δψ. Then, the yaw moment My in which the required yaw moment M is distributed to the left and right wheel driving force adjustment controller 5 is calculated, and its signal is outputted to the left and right wheel driving force adjustment controller 5. And the left and right wheel driving force adjustment controller 5 operates the left and right wheel driving force adjustment mechanism 4 according to the magnitude of yaw moment My, producing a movement torque between the rear wheels 2c and 2d to transfer the driving force.

Accordingly, in the range (BL1), (BM1) or (BH1), the left and right wheel driving force adjustment mechanism 4 is only operated based on the yaw rate deviation Δψ to give the yaw moment My to the vehicle 1. That is, the control is made to satisfy M=My in the range (BL1), (BM1) or (BH1).

Next, if it is determined that the yaw rate deviation Δψ is in the range (CL1), (CM1) or (CH1), the required yaw moment M given to the vehicle 1 is calculated, based on the yaw rate deviation Δψ. Then, the yaw moments My and Ms in which the required yaw moment M is distributed to the left and right wheel driving force adjustment controller 5 and the braking force adjustment controller 9 are calculated, and its signal is outputted to the left and right wheel driving force adjustment controller 5 and the braking force adjustment controller 9. And the left and right wheel driving force adjustment controller 5 operates the left and right wheel driving force adjustment mechanism 4 according to the magnitude of yaw moment My, producing a movement torque between the rear wheels 2c and 2d to transfer the driving force. At the same time, the braking force adjustment controller 9 operates the braking force adjustment mechanism 7 according to the magnitude of yaw moment Ms, producing a braking force in each of the wheels 2a to 2d.

Accordingly, in the range (CL1), (CM1) or (CH1), the left and right wheel driving force adjustment mechanism 4 and the braking force adjustment mechanism 7 are operated based on the yaw rate deviation Δψ to give the yaw moments My and Ms to the vehicle 1. That is, the control is made to satisfy M=My+Ms in the range (CL1), (CM1) or (CH1).

Herein, the control system for the turning behavior control device for vehicle in this embodiment which integrally controls the left and right wheel driving force adjustment control and the braking force adjustment control is conceptually shown in FIGS. 3A to 3C. FIGS. 3A to 3C show the yaw moment amounts (yaw moments My, Ms) to be distributed from the relationship between the yaw rate deviation Δψ and the required yaw moment M according to the road surface situation, as well as showing the low μ road in the range (1), the middle μ road in the range (2) and the high μ road in the range (3).

The required yaw moment M is given to the vehicle 1 to over-steer or under-steer, depending on whether the vehicle 1 is turning to the left or right, or whether the yaw rate deviation Δψ is positive or negative. In FIGS. 3A to 3C, an area where the yaw rate deviation Δψ is positive is only explained, but an area where the yaw rate deviation Δψ is negative is not explained, because the required yaw moment M is negative.

As shown in FIGS. 3A to 3C, when the yaw rate deviation Δψ is in the range (AL1), (AM1) or (AH1), the normal operation is performed in which the yaw rate deviation Δψ is below the first threshold value L1a, Ma1 or Ha1, whereby the left and right wheel driving force adjustment mechanism 4 and the braking force adjustment mechanism 7 are not operated. Thereby, the control load is relieved, and the reluctant control is dispensed with when the yaw rate deviation $\Delta\psi$ is almost zero, whereby the handling and stability is improved.

Next, when the yaw rate deviation $\Delta\psi$ is in the range (BL1), (BM1) or (BH1), the area is so minute that the yaw rate deviation $\Delta\psi$ is beyond the first threshold value L1$a$, Ma1 or Ha1, whereby the left and right wheel driving force adjustment mechanism 4 is only operated, and the yaw moment My is only given to the vehicle 1. And the yaw moment My is increased as the yaw rate deviation $\Delta\psi$ is greater.

Also, the first threshold value La1, Ma1 or Ha1 for the left and right wheel driving force adjustment mechanism 4 to start the operation is at the almost same position (yaw rate deviation $\Delta\psi$), but the second threshold values Lb1, Mb1 and Hb1 are set to increase from the low $\mu$ road to the high $\mu$ road. That is, Lb1<Mb1<Hb1, whereby the ranges of (BL1), (BM1) and (BH1) are gradually wider from the low $\mu$ road to the high $\mu$ road. That is, the control is made such that as the frictional coefficient $\mu$ is higher, the control amount of the left and right wheel driving force adjustment mechanism 4 to take effect on the high $\mu$ road is increased, and the yaw moment My is greater. Moreover, since the left and right wheel driving force adjustment mechanism 4 is only operated, the vehicle can run smoothly without causing a feeling of deceleration.

Next, when the yaw rate deviation $\Delta\psi$ is in the range (CL1), (CM1) or (CH1), the yaw moments My and Ms are given to the vehicle 1. Though the yaw moment My is given by a constant quantity to the vehicle 1, the yaw moment Ms is increased, as the yaw rate deviation $\Delta\psi$ is greater, and kept constant, if the yaw rate deviation $\Delta\psi$ is greater than or equal to a predetermined value. That is, the operation amount of the braking force adjustment mechanism 7 is increased as the yaw rate deviation $\Delta\psi$ is greater, while the operation amount of the left and right wheel driving force adjustment mechanism 4 is kept constant, and the operation amount of the braking force adjustment mechanism 7 is kept constant, if the yaw rate deviation $\Delta\psi$ is greater than or equal to the predetermined value. That is, the required yaw moment M is constant.

Also, the second threshold value Lb1, Mb1 or Hb1 for the braking force adjustment mechanism 7 to start the operation is set to increase from the low $\mu$ road to the high $\mu$ road. That is, Lb1<Mb1<Hb1, whereby the ranges of (CL1), (CM1) and (CH1) are gradually narrower from the low $\mu$ road to the high $\mu$ road.

That is, as the frictional coefficient $\mu$ is higher, the control amount of the left and right wheel driving force adjustment mechanism 4 to take effect on the high $\mu$ road is increased, and as the frictional coefficient $\mu$ is higher, the control amount of the braking force adjustment mechanism 7 difficult to take effect on the high $\mu$ road is decreased. In other words, as the frictional coefficient $\mu$ is lower, the control amount of the left and right wheel driving force adjustment mechanism 4 difficult to take effect on the low $\mu$ road is decreased, and as the frictional coefficient $\mu$ is lower, the control amount of the braking force adjustment mechanism 7 to take effect on the low $\mu$ road is increased, so that the braking force adjustment mechanism 7 is operated at the early time. And the control is made such that the yaw moment My increases and the yaw moment Ms decreases from the low $\mu$ road to the high $\mu$ road.

Further, if the control system is considered as a whole, the left and right wheel driving force adjustment mechanism 4 and the braking force adjustment mechanism 7 are operated in order as the yaw rate deviation $\Delta\psi$ increases, whereby the mechanisms 4 and 7 can take partial charge of the role without causing control interference among the mechanisms 4 and 7 and exhibit their advantages. Since the mechanisms 4 and 7 can give the yaw moments My and Ms to the vehicle 1 according to the magnitude of the yaw rate deviation $\Delta\psi$, the behavior of the vehicle can be stabilized efficiently.

The braking force adjustment mechanism 7 is principally controlled on the low $\mu$ road, so that a large yaw moment Ms can be easily given to the vehicle 1, whereby the handling and stability of the vehicle 1 is improved, as shown in FIG. 3A. Also, the operation frequency of the braking force adjustment mechanism 7 can be smaller on the high $\mu$ road, whereby it is possible to suppress the problem with the brake wear-out or heat generation, and a feeling of deceleration caused by the operation of brake, as shown in FIG. 3C.

Though in this embodiment, the required yaw moment M is given to the vehicle 1 based on the frictional coefficient $\mu$ detected at every predetermined period, the driver himself or herself determines what the road surface situation is the low $\mu$ road, the middle $\mu$ road or the high $\mu$ road, and may control the vehicle 1 by manipulating the mode changeover switch 12. Though the left and right wheel driving force adjustment mechanism 4 as the left and right wheel driving force adjustment unit is provided on the rear wheels 2$c$ and 2$d$, it may be provided on the front wheels 2$a$ and 2$b$.

Accordingly, the turning behavior control device for vehicle according to the invention comprises the left and right wheel driving force adjustment mechanism 4 for adjusting a difference in driving force between the rear wheels 2$c$ and 2$d$, the braking force adjustment mechanism 7 for adjusting a difference in braking force between the wheels 2$a$ to 2$d$, the vehicle velocity sensor 13 for detecting the behavior of the vehicle 1, the steering angle sensor 14 and the yaw rate sensor 15, the control unit 10 for integrally controlling the left and right wheel driving force adjustment mechanism 4 and the braking force adjustment mechanism 7, based on the vehicle velocity V, steering angle $\theta$ and the yaw rate $\psi$ detected by the sensors 13, 14 and 15, and changing at least one of the left and right driving force control amount of the left and right wheel driving force adjustment mechanism 4 and the braking force control amount of the braking force adjustment mechanism 7, whereby the handling and stability of the vehicle 1 is improved.

Also, the control device 10 can change the control proportion between the left and right driving force control amount of the left and right wheel driving force adjustment mechanism 4 and the braking force control amount of the braking force adjustment mechanism 7 to change the vehicle performance, whereby the handling and stability of the vehicle 1 is improved.

Also, the control unit 10 has the yaw rate deviation calculation section 18 for calculating the target yaw rate $\psi'$ based on the vehicle velocity V and the steering angle $\theta$, and calculating a difference between the target yaw rate $\psi'$ and the yaw rate $\psi$, as the yaw rate deviation $\Delta\psi$, and can integrally control the left and right wheel driving force adjustment mechanism 4 and the braking force adjustment mechanism 7 according to the required yaw moment M, by calculating the required yaw moment M given to the vehicle 1 based on the yaw rate deviation $\Delta\psi$ detected by the yaw rate deviation calculation section 18, so that the mechanisms 4 and 7 can give the yaw moments My and Ms to the vehicle 1 according to the magnitude of the yaw rate deviation $\Delta\psi$, whereby the vehicle behavior is stabilized efficiently.

Also, the control device 10 has the road surface situation detector 11 for detecting or estimating the frictional coefficient μ on the road surface, and can change at least one of the left and right driving force control amount of the left and right wheel driving force adjustment mechanism 4 and the braking force control amount of the braking force adjustment mechanism 7, based on the frictional coefficient μ detected by the road surface situation detector 11, so that the adjustment mechanisms 4 and 7 can give the yaw moments My and Ms to the vehicle 1 according to the frictional coefficient μ, whereby the handling and stability of the vehicle 1 is improved.

Also, the control device 10 increases the left and right driving force control amount of the left and right wheel driving force adjustment mechanism 4 and decreases the braking force control amount of the braking force adjustment mechanism 7 to increase the contribution factor of the left and right wheel driving force adjustment mechanism 4 to the left and right driving force control, as the frictional coefficient μ is higher, whereby the turning performance is improved with more drive efficiency. Moreover, since the operation frequency of the braking force adjustment mechanism 7 is reduced, it is possible to suppress the problem with the clutch wear-out, brake wear-out or heat generation, and a feeling of deceleration.

Embodiment 2

Figure 4:
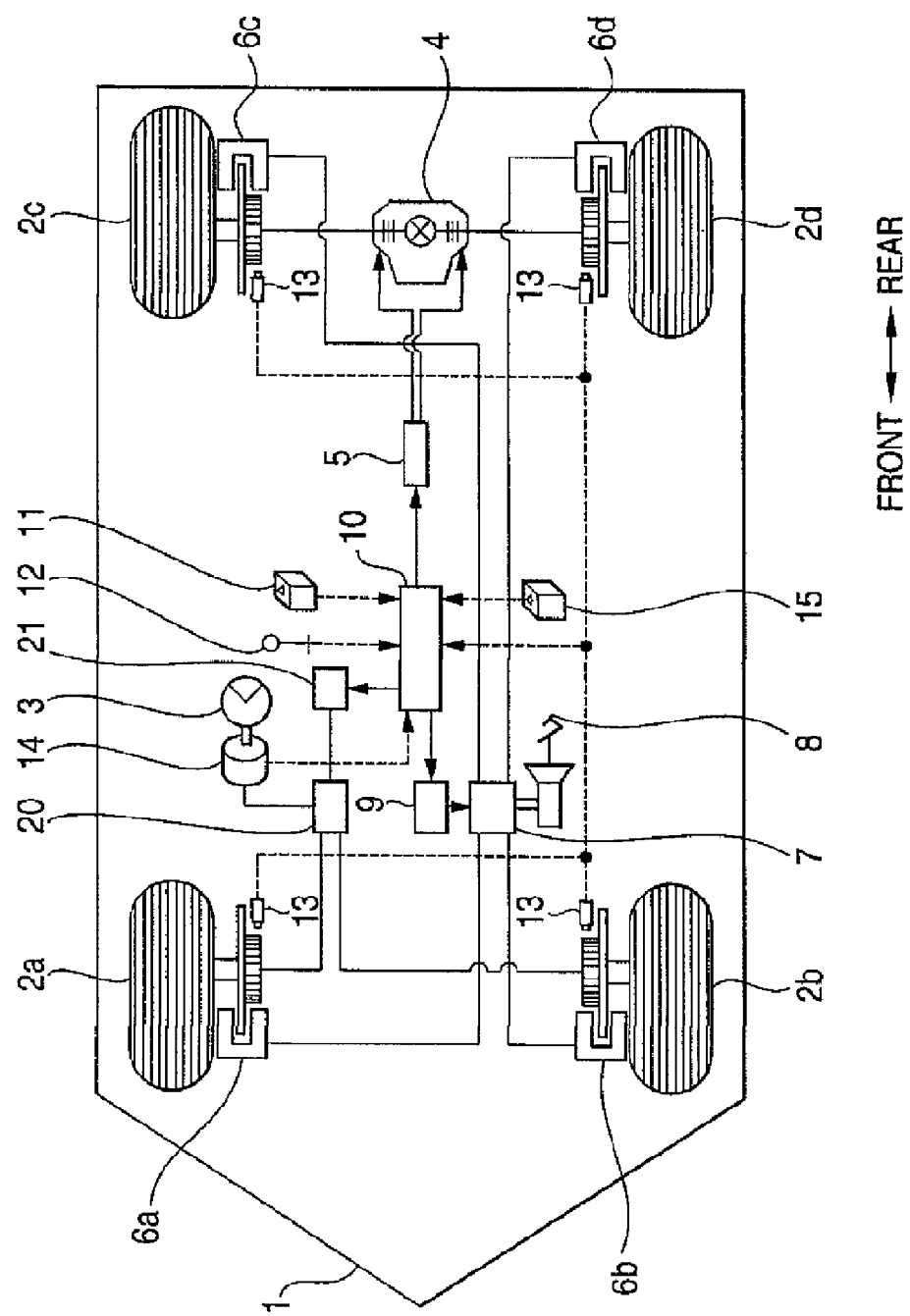
FIG. 4 is a schematic diagram of the vehicle having a turning behavior control device according to a second embodiment of the invention.
Figure 5:
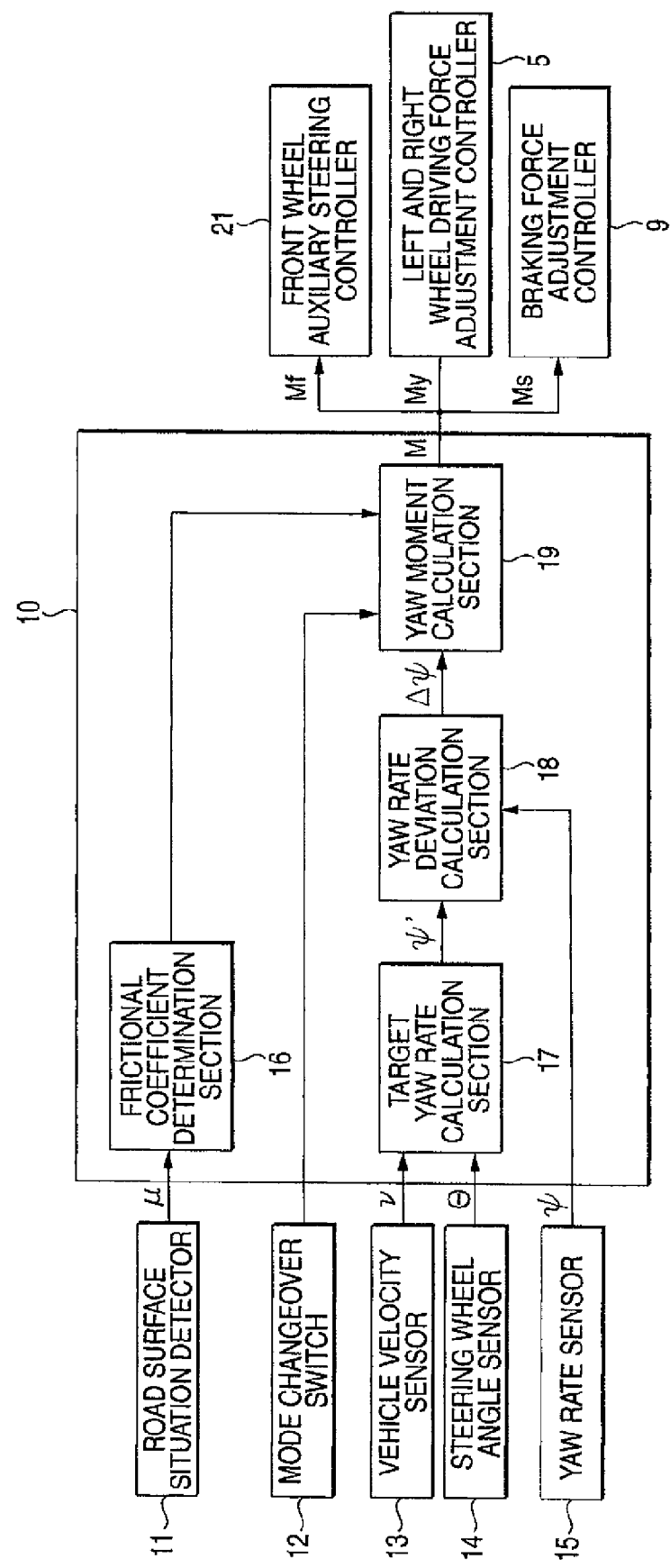
FIG. 5 is a block diagram of a control unit in the turning behavior control device.
Figure 6C:
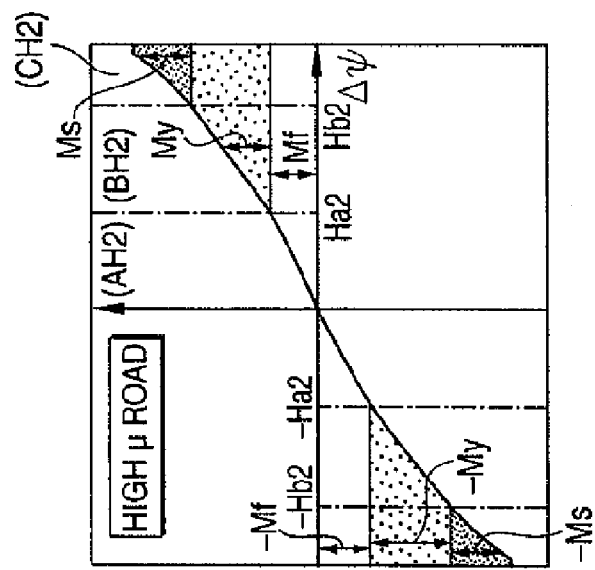
FIG. 6C is a graph showing conceptually the control system on a high $\mu$ road.
Figure 6B:
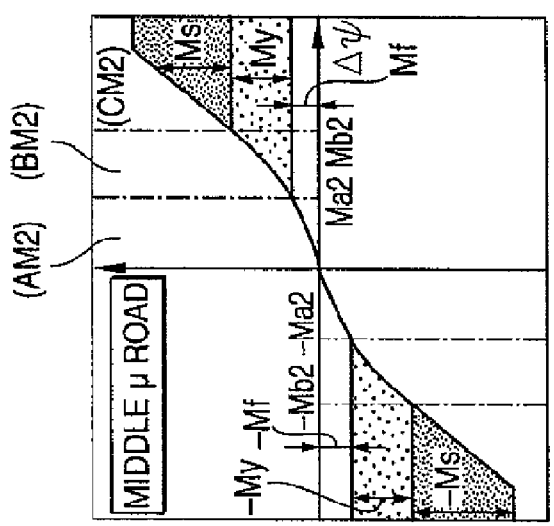
FIG. 6B is a graph showing conceptually the control system on a middle $\mu$ road.
Figure 6A:
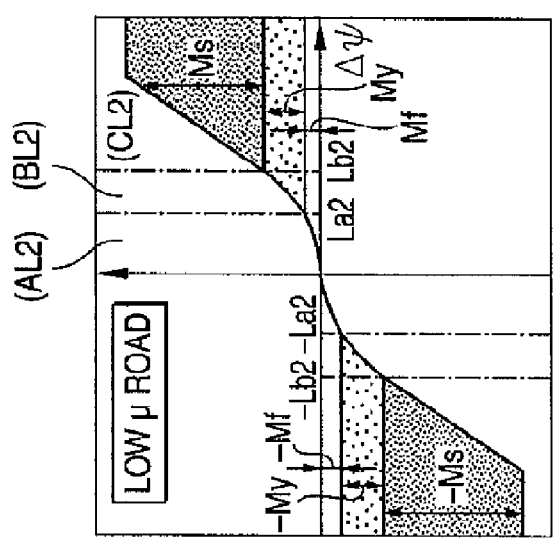
FIG. 6A is a graph showing conceptually a control system on a low $\mu$ road.

FIG. 4 is a schematic diagram of the vehicle having a turning behavior control device according to a second embodiment of the invention. FIG. 5 is a block diagram of a control unit. FIGS. 6A to 6C are graphs showing conceptually an integral control system for the left and right wheel driving force adjustment control and the braking force adjustment control according to frictional coefficient. The parts having the same or like functions are designated by the same numerals as described in the first embodiment, and are not described here.

As shown in FIG. 4, a front wheel auxiliary steering mechanism 20 is provided between the front wheels 2a and 2b, and connected to a steering 3 and a front wheel auxiliary steering controller 21. And the front wheel auxiliary steering controller 21 is connected to the control unit 10. The front wheel auxiliary steering mechanism 20 is composed of a drive motor, a gear mechanism and a link mechanism (each not shown) to control a differential angle between the steering angle of the steering 3 and the steering angle of the front wheels 2a, 2b. Usually, a steering shaft (not shown) is rotated in proportion to the angle of rotation of the steering 3 to steer the front wheels 2a, 2b. By driving the drive motor, the rotation of the steering shaft is increased or decreased according to the angle of rotation of the steering 3, producing a differential angle between the steering angle of the steering 3 and the steering angle of the front wheels 2a, 2b.

As shown in FIG. 5, the yaw moment calculation section 19 calculates a required yaw moment M given to the vehicle 1 while turning, based on the yaw rate deviation Δψ calculated by the yaw rate deviation calculation section 18, and distributes the required yaw moment M to the front wheel auxiliary steering controller 21, the left and right wheel driving force adjustment controller 5 and the braking force adjustment controller 9 at a predetermined ratio. At this time, it is assumed that the yaw moment distributed to the front wheel auxiliary steering controller 21 (front wheel auxiliary steering mechanism 20) is Mf, the yaw moment distributed to the left and right wheel driving force adjustment controller 5 (left and right wheel driving force adjustment mechanism 4) is My, and the yaw moment distributed to the braking force adjustment controller 9 (braking force adjustment mechanism 7) is Ms. That is, the yaw moment calculation section 19 distributes the required yaw moment M to the front wheel auxiliary steering controller 21, the left and right wheel driving force adjustment controller 5 and the braking force adjustment controller 9 to satisfy the expression M=Mf+My+Ms.

That is, the control unit 10 controls the front wheel auxiliary steering mechanism 20, the left and right wheel driving force adjustment mechanism 4 and the braking force adjustment mechanism 7 integrally via the front wheel auxiliary steering controller 21, the left and right wheel driving force adjustment controller 5 and the braking force adjustment controller 9 by distributing the required yaw moment (operation amount) to them, based on the vehicle velocity V detected by the vehicle velocity sensor 13, the steering angle θ of the steering 3 detected by the steering wheel angle sensor 14 and the yaw rate ψ of the vehicle 1 detected by the yaw rate sensor 15.

A processing procedure of the control unit 10 configured in the above way will be described below.

The frictional coefficient μ, the vehicle velocity V, the steering angle θ and the yaw rate ψ are detected at every predetermined period. If a signal of the detected frictional coefficient μ is inputted into the frictional coefficient determination section 16, the magnitude of frictional coefficient μ is determined. This determination is made based on whether or not the frictional coefficient μ is greater than a first threshold value μa2, and if it is greater than the first threshold value μa2, whether or not it is less than a second threshold value μb2. And there are following three cases (1) to (3), depending on the magnitude of the frictional coefficient μ.

$$|\mu| < \mu a2 \quad (1)$$

$$\mu a2 \leq |\mu| < \mu b2 \quad (2)$$

$$\mu b2 \leq |\mu| \quad (3)$$

As described above, three ranges are set up by setting the first threshold value μa2 and the second threshold value μb2, in which the range (1) is a low μ road, the range (2) is a middle μ road, and the range (3) is a high μ road. And any signal is outputted to the yaw moment calculation section 19.

If a signal of the detected vehicle velocity V and steering angle θ is inputted into the target yaw rate calculation section 17, the target yaw rate ψ' is calculated. On the other hand, if a signal of the detected yaw rate ψ is inputted into the yaw rate deviation calculation section 18, the yaw rate deviation Δψ is calculated based on the yaw rate ψ and the target yaw rate ψ' inputted from the target yaw rate calculation section 17, and its signal is outputted to the yaw moment calculation section 19. At this time, the yaw rate deviation Δψ is obtained from a difference (Δψ=ψ'−ψ) between the target yaw rate ψ' and the yaw rate ψ.

The yaw moment calculation section 19 first of all switches to a control map of low μ road, middle μ road or high μ road, based on a signal inputted from the frictional coefficient determination section 16. Then, the yaw rate calculation section 19 calculates the required yaw moment M, based on the yaw rate deviation Δψ inputted from the yaw rate deviation calculation section 18, and determines the magnitude of yaw rate deviation Δψ. This determination is made based on whether or not the yaw rate deviation Δψ is greater than a first threshold value La2, Ma2 or Ha2, depending on the range (1) to (3) for the frictional coefficient μ, and further whether or not it is less than a second threshold value Lb2, Mb2 or Hb2, if it is greater than the first threshold value La2, Ma2 or Ha2. And there are following three cases (AL2) to (CL2) for the range (1), (AM2) to (CM2) for the range (2), and (AH2) to (CH2) for the range (3), depending on the magnitude of yaw rate deviation $\Delta\psi$.

Case of range (1)

$|\Delta\psi| < La2$                                                                                                (AL2)

$La2 \leq |\Delta\psi| < Lb2$                                                                        (BL2)

$Lb2 \leq |\Delta\psi|$                                                               (CL2)

Case of range (2)

$|\Delta\psi| < Ma2$                                        (AM2)

$Ma2 \leq |\Delta\psi| < Mb2$             (BM2)

$Mb2 \leq |\Delta\psi|$                                 (CM2)

Case of range (3)

$|\Delta\psi| < Ha2$                              (AH2)

$Ha2 \leq |\Delta\psi| < Hb2$            (BH2)

$Hb2 \leq |\Delta\psi|$                           (CH2)

As a result of this determination process, if it is determined that the yaw rate deviation $\Delta\psi$ is in the range (AL2), (AM2) or (AH2), the required yaw moment M given to the vehicle 1 is calculated, based on the yaw rate deviation $\Delta\psi$. At this time, the required yaw moment M is replaced with the yaw moment Mf, and its signal is outputted to the front wheel auxiliary steering controller 21 alone. And the front wheel auxiliary steering controller 21 operates the front wheel auxiliary steering mechanism 20 according to the magnitude of the yaw moment Mf, and controls a differential angle between the steering angle θ of the steering 3 and the steering angle of the front wheels 2a and 2b.

Accordingly, in the range (AL2), (AM2) or (AH2), the front wheel auxiliary steering mechanism 20 is only operated based on the yaw rate deviation $\Delta\psi$ to give the yaw moment Mf to the vehicle 1. That is, in the range (AL2), (AM2) or (AH2), the control is made to satisfy M=Mf.

Next, if it is determined that the yaw rate deviation $\Delta\psi$ is in the range (BL2), (BM2) or (BH2), the required yaw moment M given to the vehicle 1 is calculated, based on the yaw rate deviation $\Delta\psi$. Then, the yaw moments Mf and My in which the required yaw moment M is distributed to the front wheel auxiliary steering controller 21 and the left and right wheel driving force adjustment controller 5 are calculated, and its signal is outputted to the front wheel auxiliary steering controller 21 and the left and right wheel driving force adjustment controller 5. And the front wheel auxiliary steering controller 21 operates the front wheel auxiliary steering mechanism 20 according to the magnitude of yaw moment Mf to control a differential angle between the steering angle θ of the steering 3 and the steering angle of the front wheels 2a and 2b. At the same time, the left and right wheel driving force adjustment controller 5 operates the left and right wheel driving force adjustment mechanism 4 according to the magnitude of yaw moment My, producing a movement torque between the rear wheels 2c and 2d to transfer the driving force.

Accordingly, in the range (BL2), (BM2) or (BH2), the front wheel auxiliary steering mechanism 20 and the left and right wheel driving force adjustment mechanism 4 are operated based on the yaw rate deviation $\Delta\psi$ to give the yaw moments My and Ms to the vehicle 1. That is, the control is made to satisfy M=Mf+My in the range (BL2), (BM2) or (BH2).

Next, if it is determined that the yaw rate deviation $\Delta\psi$ is in the range (CL2), (CM2) or (CH2), the required yaw moment M given to the vehicle 1 is calculated, based on the yaw rate deviation $\Delta\psi$. Then, the yaw moments Mf, My and Ms in which the required yaw moment M is distributed to the front wheel auxiliary steering controller 21, the left and right wheel driving force adjustment controller 5 and the braking force adjustment controller 9 are calculated, and its signal is outputted to the front wheel auxiliary steering controller 21, the left and right wheel driving force adjustment controller 5 and the braking force adjustment controller 9. And the front wheel auxiliary steering controller 21 operates the front wheel auxiliary steering mechanism 20 according to the magnitude of yaw moment Mf to control a differential angle between the steering angle θ of the steering 3 and the steering angle of the front wheels 2a and 2b. At the same time, the left and right wheel driving force adjustment controller 5 operates the left and right wheel driving force adjustment mechanism 4 according to the magnitude of yaw moment My, producing a movement torque between the rear wheels 2c and 2d to transfer the driving force. Further, at the same time, the braking force adjustment controller 9 operates the braking force adjustment mechanism 7 according to the magnitude of yaw moment Ms, producing a braking force in each of the wheels 2a to 2d.

Accordingly, in the range (CL2), (CM2) or (CH2), the front wheel auxiliary steering mechanism 20, the left and right wheel driving force adjustment mechanism 4 and the braking force adjustment mechanism 7 are operated based on the yaw rate deviation $\Delta\psi$ to give the yaw moments Mf, My and Ms to the vehicle 1. That is, the control is made to satisfy M=Mf+My+Ms in the range (CL2), (CM2) or (CH2).

Herein, the control system for the turning behavior control device for vehicle in this embodiment which integrally controls the front wheel steering angle adjustment control, the left and right wheel driving force adjustment control and the braking force adjustment control is conceptually shown in FIGS. 6A to 6C. FIGS. 6A to 6C show the yaw moment amounts (yaw moments My, Ms) to be distributed from the relationship between the yaw rate deviation $\Delta\psi$ and the required yaw moment M according to the road surface situation, as well as showing the low μ road in the range (1), the middle μ road in the range (2) and the high μ road in the range (3).

The required yaw moment M is given to the vehicle 1 to over-steer or under-steer, depending on whether the vehicle 1 is turning to the left or right, or whether the yaw rate deviation $\Delta\psi$ is positive or negative. In FIG. 6, an area where the yaw rate deviation $\Delta\psi$ is positive is only explained, but an area where the yaw rate deviation $\Delta\psi$ is negative is not explained, because the required yaw moment M is negative.

As shown in FIGS. 6A to 6C, when the yaw rate deviation $\Delta\psi$ is in the range (AL2), (AM2) or (AH2), the yaw moment Mf is only given to the vehicle 1, and increased as the yaw rate deviation $\Delta\psi$ is greater. That is, the operation amount of the front wheel auxiliary steering mechanism 20 is increased, as the yaw rate deviation $\Delta\psi$ is greater.

Also, the first threshold values La2, Ma2 and Ha2 are set to increase from the low μ road to the high μ road. That is, La2<Ma2<Ha2, whereby the ranges of (AL2), (AM2) and (AH2) are gradually wider from the low μ road to the high μ road. That is, the control is made such that as the frictional coefficient μ is higher, the control amount of the front wheel auxiliary steering mechanism 20 to take effect on the high μ road is increased, and the yaw moment My is greater.

Accordingly, when the yaw rate deviation Δψ is minute as in the range (AL2), (AM2) or (AH2), the control effect of the left and right wheel driving force adjustment mechanism 4 and the braking force adjustment mechanism 7 are difficult to take effect, whereby the front wheel auxiliary steering mechanism 20 is only operated. Thereby, a dead zone of control can be eliminated, so that the handling and stability can be improved in a normal operation area (less than the first threshold value La2, Ma2 or Ha2). Since the left and right wheel driving force adjustment mechanism 4 and the braking force adjustment mechanism 7 are not operated, there is no problem with a power loss due to clutch wear-out or the clutch operation, brake wear-out or heat generation, and a feeling of deceleration caused by the operation of brake.

When the yaw rate deviation Δψ is in the range (BL2), (BM2) or (BH2), the yaw moments Mf and My are given to the vehicle 1. The yaw moment Mf is given in a constant amount to the vehicle 1, but the yaw moment My is increased as the yaw rate deviation Δψ is greater. That is, as the yaw rate deviation Δψ is greater, the operation amount of the left and right wheel driving force adjustment mechanism 4 is increased while the operation amount of the front wheel auxiliary steering mechanism 20 is kept constant.

The first threshold values La2, Ma2 and Ha2 for the left and right wheel driving force adjustment mechanism 4 to start the operation are set to increase from the low μ road to the high μ road. Also, the second threshold values Lb2, Mb2 and Hb2 are set to increase from the low μ road to the high μ road. That is, Lb2<Mb2<Hb2, whereby the ranges of (BL2), (BM2) and (BH2) are gradually wider from the low μ road to the high μ road. That is, as the frictional coefficient μ is higher, the control amount of the front wheel auxiliary steering mechanism 20 and the control amount of the left and right wheel driving force adjustment mechanism 4 to take effect on the high μ road are increased, and the yaw moment Mf, My are increased. Accordingly, since the front wheel auxiliary steering mechanism 20 and the left and right wheel driving force adjustment mechanism 4 are operated, the vehicle can run smoothly without causing a feeling of deceleration.

When the yaw rate deviation Δψ is in the range (CL2), (CM2) or (CH2), the yaw moments Mf, My and Ms are given to the vehicle 1. The yaw moments Mf and My are given in a constant amount to the vehicle 1, but the yaw moment Ms is increased as the yaw rate deviation Δψ is greater, and kept constant if the yaw rate deviation Δψ is greater than or equal to a predetermined value. That is, as the yaw rate deviation Δψ is greater, the operation amount of the braking force adjustment mechanism 7 is increased, while the operation amount of the front wheel auxiliary steering mechanism 20 and the control amount of the left and right wheel driving force adjustment mechanism 4 are kept constant.

Also, the second threshold values Lb2, Mb2 and Hb2 for the braking force adjustment mechanism 7 to start the operation are set to increase from the low μ road to the high μ road. That is, Lb2<Mb2<Hb2, whereby the ranges of (CL2), (CM2) and (CH2) are gradually narrower from the low μ road to the high μ road.

That is, as the frictional coefficient μ is higher, the control amount of the front wheel auxiliary steering mechanism 20 and the control amount of the left and right wheel driving force adjustment mechanism 4 to take effect on the high μ road are increased, and as the frictional coefficient μ is higher, the control amount of the braking force adjustment mechanism 7 difficult to take effect on the high μ road is decreased. In other words, as the frictional coefficient μ is lower, the control amount of the front wheel auxiliary steering mechanism 20 and the control amount of the left and right wheel driving force adjustment mechanism 4 difficult to take effect on the low μroad are decreased, and as the frictional coefficient μ is lower, the control amount of the braking force adjustment mechanism 7 to take effect on the low μ road is increased, so that the braking force adjustment mechanism 7 is operated at the early time. And the yaw moment Mf and My are increased and the yaw moment Ms is decreased from the low μ road to the high μ road under the control.

Further, if the control system is considered as a whole, the front wheel auxiliary steering mechanism 20, the left and right wheel driving force adjustment mechanism 4 and the braking force adjustment mechanism 7 are operated in order as the yaw rate deviation Δψ increases, whereby the mechanisms 20, 4 and 7 can take partial charge of the role without causing control interference among the mechanisms 20, 4 and 7 and exhibit their advantages. Since the mechanisms 20, 4 and 7 can give the yaw moments Mf, My and Ms to the vehicle 1 according to the magnitude of the yaw rate deviation Δψ, the behavior of the vehicle can be stabilized efficiently.

And since the front wheel auxiliary steering mechanism 3 is operated at not only less than or equal to the first threshold value La2, Ma2 or Ha2 (dead zone, during the normal operation) but also greater than or equal to the first threshold value La2, Ma2 or Ha2 (critical area), the operation frequency of the left and right wheel driving force adjustment mechanism 4 and the braking force adjustment mechanism 7 can be smaller, whereby it is possible to suppress the problem with a power loss due to clutch wear-out or the clutch operation, brake wear-out or heat generation, and a feeling of deceleration caused by the operation of brake. Further, the front wheel auxiliary steering mechanism 20 is always operated before the left and right wheel driving force adjustment mechanism 4 or the braking force adjustment mechanism 7 is operated, whereby the first threshold values La2, Ma2 and Ha2 and the second threshold values Lb2, Mb2 and Hb2 can be greater. Accordingly, the problem occurring when the left and right wheel driving force adjustment mechanism 4 and the braking force adjustment mechanism 7 are operated can be further reduced.

Figure 7:
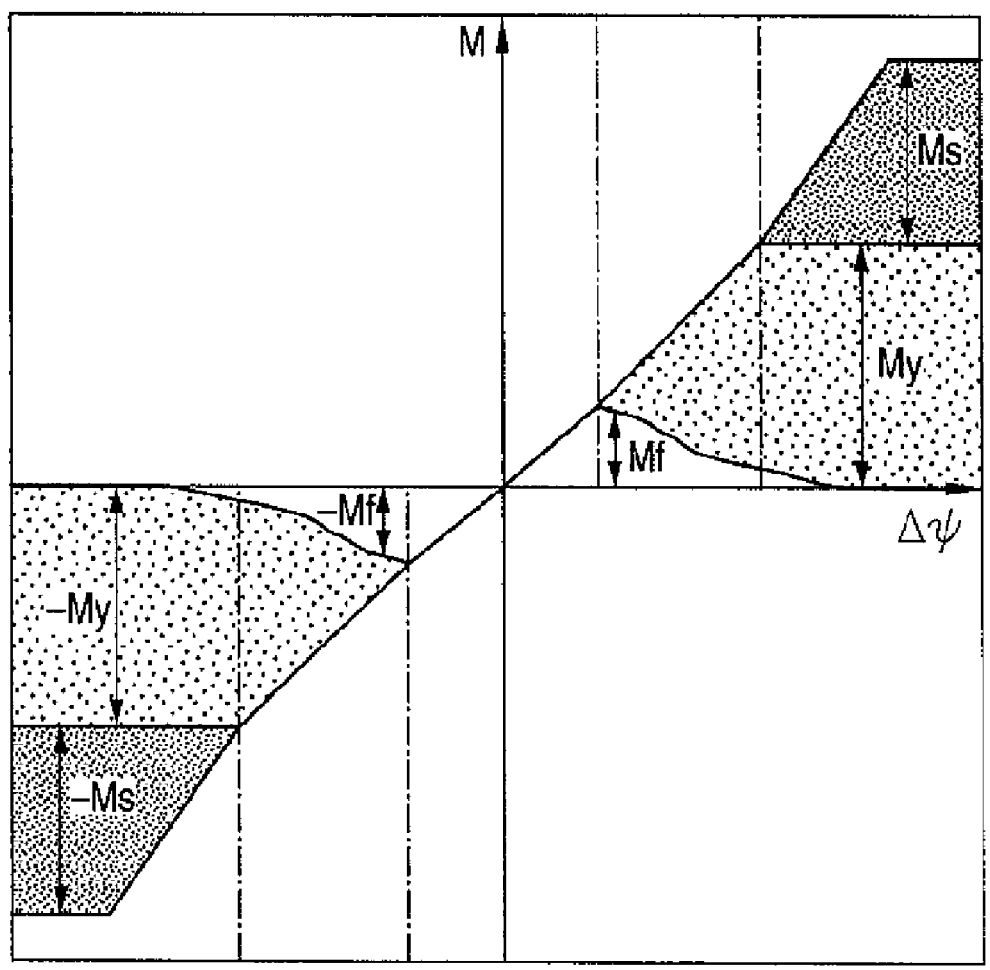
FIG. 7 is a graph showing conceptually another control system according to the second embodiment.

The operation amount of the front wheel auxiliary steering mechanism 20 can be reduced so that the yaw moment Mf may decrease from the range where it is greater than or equal to the first threshold value La2, Ma2 or Ha2, namely, from the range (BL2), (BM2) or (BH2), as shown in FIG. 7. Thereby, in this critical area where the steering angle adjustment control effect of the front wheel auxiliary steering mechanism 20 is small, the left and right wheel driving force adjustment mechanism 4 or the braking force adjustment mechanism 7 can be operated in larger amount, whereby the handling and stability of the vehicle 1 can be improved.

While in this embodiment, the required yaw moment M is given to the vehicle 1 based on the frictional coefficient μ detected at every predetermined period, the driver may determine what the road surface situation is the low μ road, the μ middle road or the high μ road, and manipulate the mode changeover switch 12 to control the vehicle 1. And the front wheel auxiliary steering mechanism 20 as the steering angle adjustment unit is provided on the front wheels 2a and 2b, but may be provided on the rear wheel 2c and 2d. Also, the left and right wheel driving force adjustment mechanism 4 as the left and right wheel driving force adjustment unit is provided on the rear wheels 2c and 2d, but may be provided on the front 2a and 2b.

Accordingly, the turning behavior control device for vehicle according to the invention comprises the left and right wheel driving force adjustment mechanism 4 for adjusting a difference in driving force between the rear wheels 2c and 2d, the braking force adjustment mechanism 7 for adjusting a difference in braking force between the wheels 2a to 2d, the front wheel auxiliary steering mechanism 20 for adjusting the steering angle of the front wheels 2a and 2b, the vehicle velocity sensor 13, the steering angle sensor 14 and the yaw rate sensor 15 for detecting the behavior of the vehicle 1, the control unit 10 for integrally controlling the left and right wheel driving force adjustment mechanism 4, the braking force adjustment mechanism 7 and the front wheel auxiliary steering mechanism 20, based on the vehicle velocity V, steering angle θ and the yaw rate ψ detected by the sensors 13, 14 and 15, and changing at least one of the left and right driving force control amount of the left and right wheel driving force adjustment mechanism 4, the braking force control amount of the braking force adjustment mechanism 7 and the steering angle control amount of the front wheel auxiliary steering mechanism 20, whereby the dead zone of the vehicle control can be eliminated and the handling and stability of the vehicle 1 can be improved.

Also, the control device 10 can change the control proportion between the left and right driving force control amount of the left and right wheel driving force adjustment mechanism 4, the braking force control amount of the braking force adjustment mechanism 7 and the steering angle control amount of the front wheel auxiliary steering mechanism 20 to change the vehicle performance, whereby the handling and stability of the vehicle 1 is improved.

Also, the control unit 10 has the yaw rate deviation calculation section 18 for calculating the target yaw rated ψ' based on the vehicle velocity V and the steering angle θ, and calculating a difference between the target yaw rate ψ' and the yaw rate ψ, as the yaw rate deviation Δψ, and can integrally control the left and right wheel driving force adjustment mechanism 4, the braking force adjustment mechanism 7 and the front wheel auxiliary steering mechanism 20 according to the required yaw moment M, by calculating the required yaw moment M given to the vehicle 1 based on the yaw rate deviation Δψ detected by the yaw rate deviation calculation section 18, so that the mechanisms 4, 7 and 20 can give the yaw moments My, Ms and Mf to the vehicle 1 according to the magnitude of the yaw rate deviation Δψ, whereby the vehicle behavior is stabilized efficiently.

Also, the control device 10 has the road surface situation detector 11 for detecting or estimating the frictional coefficient μ on the road surface, and can change at least one of the left and right driving force control amount of the left and right wheel driving force adjustment mechanism 4, the braking force control amount of the braking force adjustment mechanism 7 and the steering angle control amount of the front wheel auxiliary steering mechanism 20, based on the frictional coefficient μ detected by the road surface situation detector 11, so that the adjustment mechanisms 4, 7 and 20 can give the yaw moments My, Ms and Mf to the vehicle 1 according to the frictional coefficient μ, whereby the handling and stability of the vehicle 1 is improved.

Also, the control device 10 increases the left and right driving force control amount of the left and right wheel driving force adjustment mechanism 4 and the steering angle control amount of the front wheel auxiliary steering mechanism 20, and decreases the braking force control amount of the braking force adjustment mechanism 7 to increase the contribution factor of the left and right wheel driving force adjustment mechanism 4 to the left and right driving force control and the front wheel auxiliary steering mechanism 20 to the steering angle control, as the frictional coefficient μ is higher, whereby the turning performance is improved efficiently. Moreover, since the operation frequency of the braking force adjustment mechanism 7 is reduced, it is possible to suppress the problem with the brake wear-out or heat generation, and a feeling of deceleration.

The invention is applicable to the turning behavior control device for vehicle with the improved handling and stability of the vehicle while turning.

What is claimed is:

1. A turning behavior control device for a vehicle, comprising:
   a left and right wheel driving force adjustment unit that adjusts a difference in driving force between left and right wheels for the vehicle;
   a braking force adjustment unit that adjusts a difference in braking force between each wheel for the vehicle;
   a vehicle behavior detection unit that detects the behavior of the vehicle;
   a road surface situation information acquisition unit that acquires the information concerning a frictional coefficient of a road surface situation;
   a control unit that controls the left and right wheel driving force adjustment unit and the braking force adjustment unit by setting a left and right driving force control amount and a braking force control amount, based on the vehicle behavior detected by the vehicle behavior detection unit; and
   a control amount change unit that causes the control unit to increase the left and right driving force control amount and decrease the braking force control amount, as the frictional coefficient acquired by the road surface situation information acquisition unit is higher.

2. The turning behavior control device for vehicle according to claim 1, wherein the control amount change unit changes a proportion of the left and right driving force control amount to the braking force control amount to increase as the frictional coefficient is higher.

3. The turning behavior control device for vehicle according to claim 1, wherein the vehicle behavior detection unit comprises a vehicle velocity detection unit that detects a vehicle velocity of the vehicle, a steering amount detection unit that detects a steering amount of the vehicle, a yaw rate detection unit that detects a yaw rate occurring in the vehicle, and a yaw rate deviation calculation unit that calculates a target yaw rate based on the vehicle velocity and the steering amount and calculates a difference between the target yaw rate and the yaw rate as a yaw rate deviation, and the control unit calculates a moment given to the vehicle, based on the yaw rate deviation detected by the yaw rate deviation calculation unit, and controls the left and right wheel driving force adjustment unit and the braking force adjustment unit according to the moment.

4. The turning behavior control device for vehicle according to claim 1, wherein:
   the control unit calculates a required yaw moment given to the vehicle based on the vehicle behavior detected by the vehicle behavior detection unit;
   the control unit operates the left and right wheel driving force adjustment unit when the required yaw moment is greater than a first threshold value, and operates the braking force adjustment unit when the required yaw moment greater than a second threshold value which is greater than the first threshold value; and the control amount change unit increases the second threshold value as the frictional coefficient is higher.

5. The turning behavior control device for vehicle according to claim 1, further comprising:

a steering angle adjustment unit that adjusts a steering angle for at least one of the front and rear wheels for the vehicle, wherein the control unit controls the left and right wheel driving force adjustment unit, the braking force adjustment unit and the steering angle adjustment unit, based on the vehicle behavior detected by the vehicle behavior detection unit.

6. The turning behavior control device for vehicle according to claim 1, wherein the road surface situation information acquisition unit acquires the information concerning the frictional coefficient of the road surface based on a switched position of a mode changeover switch.

7. The turning behavior control device for vehicle according to claim 5, wherein:

the control unit calculated a required yaw moment given to the vehicle based on the vehicle behavior detected by the vehicle behavior detection unit;

the control unit operates the steering angle adjustment unit when the required yaw moment is no greater than a first threshold value, operates the left and right wheel driving force adjustment unit when the required yaw moment is greater than the first threshold value, and operates the braking force adjustment unit when the required yaw moment is greater than a second threshold value which is greater than the first threshold value; and the control amount change unit increases the first threshold value and the second threshold value as the frictional coefficient is higher.

8. The turning behavior control device for vehicle according to claim 7, wherein the control amount change unit decreases a control amount of the steering angle adjustment unit as the required yaw moment is higher.

* * * * *